Patented Mar. 24, 1953

2,632,774

UNITED STATES PATENT OFFICE 2,632,774

OXIDATION OF AROMATIC HYDROCARBONS

Joshua C. Conner, Jr., and Arthur D. Lohr, Wilmington, Del., assignors to Hercules Powder Company, Wilmington, Del., a corporation of Delaware No Drawing. Application November 18, 1949,
Serial No. 128,238

8 Claims. (Cl. 260—610)

1

This invention relates to a process of oxidizing an alkyl-substituted aromatic organic compound having the structural formula

in which $R_1$ and $R_2$ represent alkyl groups and Ar represents a substituent selected from the group consisting of aryl and alkaryl groups. More particularly, the invention relates to the oxidation of compounds such as cumene and p-cymene in the liquid phase by means of molecular oxygen.

It is known that cumene and p-cymene, for example, may be oxidized in the liquid phase by means of molecular oxygen but none of the prior processes have been successful in effecting substantial yields of α,α-dimethylbenzyl and α,α-dimethyl-p-methylbenzyl hydroperoxides, respectively. The main reaction products, instead, have been ketones and alcohols, and the same is true for other compounds having the above structural formula.

Now in accordance with this invention it has been found that high yields of tertiary hydroperoxides having the structural formula

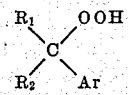

may be prepared by intimately contacting under substantially anhydrous conditions an alkyl-substituted aromatic organic compound, having the structural formula previously described, in liquid phase with an oxygen-containing gas in the presence of a catalyst of the group consisting of alkali metal and alkaline earth metal oxides and hydroxides and mixtures thereof at a temperature between about 90° and about 145° C. for a time no greater at any particular temperature than that defined by the equation $$\log_e A = 11.672 - 0.0774t$$

where A equals the time in hours and $t$ equals the temperature in ° C. In the structural formula for the hydroperoxide $R_1$, $R_2$ and Ar have the same significance as in the formula for the alkyl-substituted aromatic organic compound.

In carrying out the process of this invention a catalytic amount of a catalyst such as calcium hydroxide is added to cumene, for example, and the reaction mixture then is agitated vigorously while a stream of air or oxygen is simultaneously passed through the reaction mixture. The reaction is carried out at a temperature between

2 about 90° and about 145° C., and, depending upon the particular temperature utilized, the time of reaction will not exceed the number of hours defined by the equation previously set forth. By so carrying out the oxidation with any of the alkyl-substituted aromatic organic compounds having the structural formula previously described, the amount of hydroperoxide by weight, based on the total amount of oxygenated products, will always be greater than 80%. At the end of the oxidation known techniques may be utilized to work up the reaction mixture and recover the hydroperoxide product.

The following examples constitute specific illustrations of the process of this invention. All amounts are based on parts by weight.

Example 1

A closed reaction vessel fitted with a reflux condenser, a gas inlet tube, a thermometer, and an efficient high-speed agitator was charged with 400 parts of p-cymene ($n_D^{30} = 1.4953$) and 8 parts of calcium hydroxide. The reaction mixture was brought to a temperature of 100° C. and air was passed through the mixture at a rate of 132.5 cc./min./kg. of cymene. This amount of air constituted a 100% excess over the theoretical amount required to carry out the oxidation. Samples were taken at periodic intervals for refractive index and hydroperoxide determinations, the hydroperoxide content of the oxidized oil being determined by adding a sample of the oil to acidified potassium iodide and noting the amount of iodine liberated. At the end of 17.4 hours the oxidized oils had a refractive index of 1.4880, which indicated a conversion of approximately 11.9% of the p-cymene to oxidized materials, and the hydroperoxide content was 11.4%. The amount of hydroperoxide in the oxidation product therefore was 95.8%. After 40.7 hours the refractive index was 1.4918, the conversion was 26.6%, and the amount of α,α-dimethyl-p-methylbenzyl hydroperoxide, based on total oxygenated products, was 86.5%. At the end of 54.5 hours the amount of hydroperoxide was 80% based on total oxygenated products. Other oxidation products found in the reaction mixture were α,α-dimethyl-p-methylbenzyl alcohol, p-methyl acetophenone, and cumic acid.

Example 2

An apparatus similar to that described in Example 1 was charged with 400 parts of p-cymene ($n_D^{30} = 1.4853$) and 8 parts of calcium hydroxide. The reaction mixture was heated to 115° C. and air passed through the mixture at a rate of 795 cc./min./kg. of p-cymene. This amount of air was greater than the theoretical. At the end of 1.7 hours the conversion to oxidized materials was 3% and the amount of $\alpha,\alpha$-dimethyl-p-methylbenzyl hydroperoxide in the oxidation product was 94%. At the end of 5.25 hours the conversion was 10.9% and the amount of hydroperoxide was 90.2%. After 14.7 hours the conversion was 33.4% and the amount of hydroperoxide was 84%.

*Example 3*

An apparatus similar to that used in Example 1 was charged with 400 parts of cumene $(n_D^{20} = 1.4913)$ and 4 parts of calcium hydroxide. The temperature was brought to 120° C. and air was passed through the reaction mixture during the first 8 hours at a rate of 2970 cc./min./kg. of cumene, and thereafter at a rate of 180° cc./min./kg. of cumene. The amount of air was greater than the theoretical. Upon completion of two hours of oxidation the conversion to oxygenated products was 3.1% and the amount of $\alpha,\alpha$-dimethylbenzyl hydroperoxide in relation to total oxygenated products was 96.6%. At the end of 9.25 hours the conversion was 27.4% and the amount of hydroperoxide was 84%. Other oxidation reaction products were acetophenone and $\alpha,\alpha$-dimethylbenzyl alcohol.

*Example 4*

An apparatus similar to that of Example 1 was charged with 400 parts of cumene and 4 parts of calcium hydroxide. The reaction mixture was heated to 130° C. and air passed through the mixture at a rate of 2075 cc./min./kg. of cumene, the amount of air being greater than the theoretical. After 5 hours of oxidation the conversion to oxygenated products was 15.4% and the amount of $\alpha,\alpha$-dimethylbenzyl hydroperoxide in relation to total oxygenated products was 85.1%. Acetophenone and $\alpha,\alpha$-dimethylbenzyl alcohol were other reaction products.

*Example 5*

Using an apparatus similar to that of Example 1, 400 parts of cumene $(n_D^{20} = 1.4907)$ was oxidized at 135° C. in the presence of 4 parts of calcium hydroxide. The air flow rate was 1200 cc./min./kg. of cumene. The amount of air was greater than the theoretical. After one hour of oxidation the conversion was 2.1% and the amount of $\alpha,\alpha$-dimethylbenzyl hydroperoxide in the oxidation products was 98.3%. Upon completion of 3.5 hours of oxidation the conversion was 8.6% and the amount of hydroperoxide was 81.3%. Other oxidation products were $\alpha,\alpha$-dimethylbenzyl alcohol and acetophenone.

*Example 6*

In an apparatus similar to that of Example 1 there were placed 400 parts of cumene $(n_D^{20} = 1.4913)$ and 4 parts of calcium hydroxide. The reaction mixture was heated to 145° C. and air passed through the mixture at a rate of 1200 cc./min./kg. of cumene, this being greater than the theoretical amount of air. Upon completion of one hour of oxidation the conversion was 3.4% and the amount of hydroperoxide in relationship to total oxygenated products was 84%. Other products were $\alpha,\alpha$-dimethylbenzyl alcohol and acetophenone.

Although the examples have set forth the use of cumene and p-cymene, other compounds having the structural formula previously set forth for the alkyl-substituted aromatic organic compounds may be utilized. Exemplary of such are p-diisopropylbenzene, sec-butylbenzene, t-butylisopropylbenzene, p-ethylisopropylbenzene, and isopropylnaphthalene. These compounds all contain a tertiary carbon atom carrying a hydrogen atom as its fourth substituent. The aryl and alkaryl groups need not be derived from benzene as is the case in p-cymene, for example, since compounds containing aromatic nuclei, such as those derived from naphthalene, anthracene and phenanthrene, also are operable. The latter compounds, however, being solids, must be dissolved in a suitable solvent such as benzene during the oxidation. The aryl group may be substituted with alkyl groups, as illustrated by the methyl group in p-cymene and the isopropyl group in p-diisopropylbenzene, and the groups may, for example, be methyl, ethyl, propyl, isopropyl, butyl, isobutyl, secondary butyl, tertiary butyl, and the like. The alkyl groups $R_1$ and $R_2$ also need not be limited to the methyl groups of p-cymene, cumene, and diisopropylbenzene. Other alkyl groups, such as those previously indicated as suitable for substitution in the aryl groups, may be utilized, and $R_1$ and $R_2$ may be either the same or different.

The examples have set forth the use of air as the oxygen-containing gas but pure oxygen may be utilized, and also operable are mixtures of oxygen with nitrogen or other inert gases. The oxygen-containing gas should be dry. The rate of input of the oxygen-containing gas should be such that at least the theoretical amount of oxygen is supplied. By theoretical amount is meant that amount of oxygen necessary to convert the alkyl-substituted aromatic organic compound completely to the corresponding hydroperoxide. Actually, it is preferable to use about twice the theoretical amount of oxygen. The rate of input will depend upon the temperature and pressure utilized during the oxidation. Using cumene as an example, it is possible to determine the rate of oxidation of this compound at any particular temperature and pressure, and knowing the rate of oxidation, it then is possible to calculate the amount of oxygen necessary to give the required rate. This amount of oxygen is the theoretical amount.

The examples have shown the use only of calcium hydroxide as the catalyst. In general, however, there may be used any alkali metal or alkaline earth metal oxide or hydroxide. Exemplary of such are sodium hydroxide, potassium hydroxide, lithium hydroxide, calcium hydroxide, barium hydroxide, strontium hydroxide, calcium oxide, and barium oxide. Mixtures of these materials also may be used. They all are used in catalytic amounts. The actual amount will vary from one material to the next depending upon its activity as a catalyst. Sodium hydroxide, for example, may be used in smaller amounts than calcium hydroxide. In general, however, the amount of catalyst may be varied from about 0.05 to about 10% by weight based on the alkyl-substituted aromatic organic compound. A preferable range on this basis is from about 1 to about 5%, and a most desirable range is from about 1 to about 3%.

The oxidations are carried out at temperatures between about 90° and about 145° C. Below 90° C. the rate of oxidation is too slow to be of value in a commercial process and above 145° C. it is not possible to obtain a substantial amount of oxygenated products in the maximum amount of time permitted to retain no less than 80% hydroperoxide based on the total oxygenated products. The temperatures used during the oxidations therefore are quite critical. It is preferable to use a temperature between about 100° and about 130° C., and a highly desirable temperature is about 120° C.

As pointed out previously, the maximum time for the oxidation at any particular temperature is given by the equation $\log_e A = 11.672 - 0.0774t$, where A equals time in hours and $t$ equals temperature in °C. A time greater than this maximum cannot be used in the process of this invention without obtaining a reaction product containing less than 80% hydroperoxide based on total oxygenated products. Times of reaction less than the maximum at any particular temperature may be used, however, and the minimum amount of time to obtain the hydroperoxide product may be of the order of about 0.1 hour. In the initial stages of the reaction the hydroperoxide will constitute practically all of the oxygenated product, and it is not until the reaction has progressed to some extent that other reaction products, such as alcohols and ketones, appear.

The oxidation may be carried out either at atmospheric or superatmospheric pressures. These oxidations carried out at greater than atmospheric pressure are limited only by equipment design. From a practical standpoint, pressures from atmospheric up to about 500 p. s. i. are feasible. A preferable range is from about 50 to about 250 p. s. i.

The oxidation reaction of this invention is heterogeneous, consequently suitable agitation is necessary. It is important to bring the air, oxygen, or other oxygen-containing gas into intimate contact with the liquid phase, and this may be effected by using high-speed stirrers, suitable nozzles, porous plates or their combinations. The course of the reaction may be followed by taking samples at intervals and determining the refractive index of the oily material.

The method utilized in recovery of the reaction products will vary depending upon the use to which the hydroperoxide is to be put. If it is not necessary to separate the hydroperoxide from other components, such as alcohols, ketones, and unreacted starting material, the reaction product may be washed with dilute aqueous alkali and used either in the wet, slightly cloudy state, or after clarification and drying by filtration. If it is desired, however, to obtain a highly concentrated hydroperoxide, the crude reaction product, after the alkali wash, may be stripped of unreacted hydrocarbon by distillation at pressures of about 1 to about 10 mm. of mercury/sq. cm. The hydroperoxides may be safely distilled at temperatures below about 100° C. using pressures of about 0.01 to about 1.0 mm. The hydroperoxides also may be separated from the reaction product by precipitation with a concentrated aqueous solution (25 to 40%) of sodium hydroxide.

The process of this invention may be carried out either batchwise or continuously. It affords a means of obtaining high yields of $\alpha,\alpha$-dialkylarylmethyl hydroperoxides while at the same time minimizing the formation of other reaction products, such as the corresponding alcohols. The process makes it possible to maintain the difference between the per cent of oxygenated products and the per cent of hydroperoxide at a minimum. In prior processes the difference between the per cent oxygenated products and the per cent hydroperoxide has been great, and the reaction product consequently has been unsatisfactory due to the existence of considerable amounts of secondary reaction products. It is necessary, in accordance with the process of this invention, to maintain the amount of hydroperoxide by weight at 80% or greater, based on the total amount of oxygenated products, in order that the hydroperoxide-containing product will be useful in the production of phenols. Action of a condensation catalyst such as sulfuric acid on $\alpha,\alpha$-dimethylbenzyl hydroperoxide, for example, results in the formation of phenol and acetone. The reaction is one of decomposition of the hydroperoxide. The reaction is complicated, however, if secondary oxidation products such as alcohols and ketones are present with the hydroperoxide being decomposed. Furthermore, such secondary oxidation products are difficult to separate from the products of the decomposition reaction. Consequently, it is necessary to use a high-purity hydroperoxide product. Use of a product containing 80% or more hydroperoxide in relationship to total oxygenated materials will avoid difficulties in the decomposition reaction.

The process of the present invention obviates all of the difficulties of other processes in obtaining high hydroperoxide yields to the practical exclusion of secondary reaction products. The hydroperoxides obtained by the process of this invention are highly useful and find various important commercial applications. In addition to being useful in the production of phenols, as mentioned above, they are excellent catalysts for the polymerization of vinyl, vinylidene, and vinylene compounds being, for example, highly useful in the copolymerization of butadiene and styrene to form synthetic rubber. They also are useful in rubber reclaiming, in flotation, and in kier boiling, bleaching, and other textile operations.

What we claim and desire to protect by Letters Patent is:

1. The process of oxidizing an alkyl-substituted aromatic organic compound to a high yield of a tertiary organic hydroperoxide which comprises passing with intimate contact and under substantially anhydrous conditions an oxygen-containing gas through a reaction mixture comprising essentially said aromatic organic compound in liquid state at a rate of input such that at least the theoretical amount of oxygen is supplied at all times throughout the oxidation reaction, in the presence of a catalyst of the group consisting of alkali metal and alkaline earth metal oxides and hydroxides, and mixtures thereof, at a temperature between about 90° and about 145° C. for a time which is between 0.1 hour and a time which is no greater at any particular temperature than that defined by the equation $\log_e A = 11.672 - 0.0774t$, where $A =$ time in hours and $t =$ temperature in said aromatic organic compound and said hydroperoxide having, respectively, the structural formulae

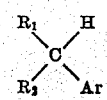

and

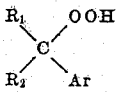

in which $R_1$ and $R_2$ represent alkyl groups and Ar represents an aryl group.

2. The process according to claim 1 wherein the compound oxidized is cumene and the hydroperoxide produced is α,α-dimethylbenzyl hydroperoxide.

3. The process according to claim 1 wherein the compound oxidized is p-cymene and the hydroperoxide produced is α,α-dimethyl-p-methylbenzyl hydroperoxide.

4. The process according to claim 1 wherein the compound oxidized is p-diisopropylbenzene and the hydroperoxide produced is α,α-dimethyl-p-isopropylbenzyl hydroperoxide.

5. The process according to claim 1 wherein the compound oxidized is sec-butylbenzene and the hydroperoxide produced is α-ethyl-α-methylbenzyl hydroperoxide.

6. The process according to claim 1 wherein the compound oxidized is p-(t-butyl)isopropylbenzene and the hydroperoxide produced is α,α-dimethyl-p-(t-butyl)benzyl hydroperoxide.

7. The process according to claim 2 wherein the catalyst is calcium hydroxide.

8. The process according to claim 3 wherein the catalyst is calcium hydroxide.

JOSHUA C. CONNER, JR.
ARTHUR D. LOHR.

REFERENCES CITED

The following references are of record in the file of this patent:

UNITED STATES PATENTS

| Number | Name | Date |
|---|---|---|
| 2,447,794 | Brewer | Aug. 24, 1948 |
| 2,527,640 | Lorand | Oct. 31, 1950 |
| 2,547,938 | Hall et al. | Apr. 10, 1951 |
| 2,548,435 | Lorand et al. | Apr. 10, 1951 |
| 2,577,768 | Joris | Dec. 11, 1951 |

FOREIGN PATENTS

| Number | Country | Date |
|---|---|---|
| 610,293 | Great Britain | Oct. 13, 1948 |

OTHER REFERENCES

Hock et al.: Ber. Deut. Chem. Gesell., vol. 72, pages 257–264.